(12) United States Patent
Raffaini et al.

(10) Patent No.: US 9,834,392 B2
(45) Date of Patent: Dec. 5, 2017

(54) TRANSFER DEVICE FOR CONVEYING PACKAGING UNITS

(71) Applicant: SIDEL PARTICIPATIONS S.A.S., Octeville-sur-Mer (FR)

(72) Inventors: Nicola Raffaini, Parma (IT); Mirko Rossi, Parma (IT); Federica Sorbi, Parma (IT)

(73) Assignee: Sidel Participations S.A.S., Octeville-sur-Mer (FR)

( * ) Notice: Subject to any disclaimer, the term of this patent is extended or adjusted under 35 U.S.C. 154(b) by 0 days.

(21) Appl. No.: 15/178,328

(22) Filed: Jun. 9, 2016

(65) Prior Publication Data

US 2016/0376105 A1 Dec. 29, 2016

(30) Foreign Application Priority Data

Jun. 25, 2015 (EP) ..................................... 15305995

(51) Int. Cl.
 *B65G 54/02* (2006.01)
 *B65G 47/08* (2006.01)
(52) U.S. Cl.
 CPC ........... *B65G 54/02* (2013.01); *B65G 47/082* (2013.01)
(58) Field of Classification Search
 CPC .................................................... B65G 19/025
 USPC ................... 198/465.4, 470.1, 620, 606, 604
 See application file for complete search history.

(56) References Cited

U.S. PATENT DOCUMENTS

| 9,688,483 | B2* | 6/2017 | Graffin | B65G 29/00 |
| 2010/0140052 | A1* | 6/2010 | Martini | B65G 47/082 |
| | | | | 198/419.2 |
| 2010/0294622 | A1* | 11/2010 | Graffin | B67C 7/004 |
| | | | | 198/470.1 |
| 2016/0289010 | A1* | 10/2016 | Wipf | B65G 19/02 |

FOREIGN PATENT DOCUMENTS

| DE | 10 2008 039036 | | 6/2010 | |
| DE | 102008039036 A1 * | 6/2010 | ............. B65G 17/26 |
| DE | 10 2013 015126 | | 3/2015 | |
| DE | 102013015126 A1 * | 3/2015 | .......... B25J 15/0616 |

(Continued)

OTHER PUBLICATIONS

Extended European Search Report dated Nov. 12, 2015, by the European Patent Office in counterpart European Patent Application No. 15305995.1 (9 pages).

*Primary Examiner* — Leslie A Nicholson, III
*Assistant Examiner* — Lester Rushin
(74) *Attorney, Agent, or Firm* — Finnegan, Henderson, Farabow, Garrett & Dunner, LLP

(57) ABSTRACT

A transfer device for conveying a plurality of packaging units along a transfer path comprising: a first carrier having at least one first operative branch parallel to the transfer path; at least one first conveying element advanced along the first carrier; a second carrier adjacent to the first carrier and having at least one second operative branch parallel to the transfer path and to the first operative branch; and at least one second conveying element controlled independently from the first conveying element and advanced along the second carrier; wherein the first conveying element and the second conveying element are configured to retain therebetween a packaging unit of the plurality of packaging units and to advance the packaging unit along the transfer path.

9 Claims, 4 Drawing Sheets

(56) References Cited

FOREIGN PATENT DOCUMENTS

| | | |
|---|---|---|
| EP | 2511203 A1 | 10/2012 |
| WO | WO 2013/185957 A1 | 12/2013 |
| WO | WO 2013/189656 A1 | 12/2013 |
| WO | WO 2015/071228 A1 | 5/2015 |

\* cited by examiner

TRANSFER DEVICE FOR CONVEYING PACKAGING UNITS

CROSS-REFERENCE TO RELATED APPLICATIONS

This application claims the benefit of priority of European Patent Application No. 15305995.1, filed on Jun. 25, 2015, which is incorporated herein by reference.

TECHNICAL FIELD

The present invention relates to a transfer device adapted to convey packaging units along a transfer path from a receiving position to a delivery position.

It is pointed out that, in the present description and in the claims, the term "packaging unit" is used to indicate any type of packaging element, such as bottles, containers, receptacles, pre-forms, etc., as well as a batch formed by two or more packaging elements transported as a single unit for any type of pourable product.

The present invention may be advantageously but not exclusively used for conveying packaging units from one treatment or handling station to another treatment or handling station or within these stations in plants for packaging pourable products, such as liquids (including still or sparkling water, juices, teas, sport drinks, liquid cleaners, wine, etc.), emulsions, suspensions and high viscosity liquids.

BACKGROUND ART

As known, in the above-mentioned plants, the packaging units need to traverse a plurality of treatment or handling steps performed by respective treatment or handling stations prior to the delivery of the pourable product stored in the packaging units themselves to store houses. Examples of treatment or handling steps are the transformation of precursors of the packaging units to their final forms, the sanitization, the filling, the closing, the labeling and the grouping of the packaging units.

Furthermore, the processing speeds and the respective velocities with which the packaging units need to be conveyed may vary from one station to the other and the possible differences in conveying velocities need to be compensated during the transport of the packaging units. Additionally, an irregular supply of packaging units may arise due to e.g. the rejection of one or more defective packaging units.

A transfer device adapted to compensate for differences in processing speeds of different treatment stations is disclosed in WO2013185957. The transfer device is adapted to convey packaging units, in particular cardboard elements, along a rectilinear transport path from a receiving position to a delivery position. The transfer device comprises a circulating carrier and a plurality of first and second conveying elements arranged in alternation on the circulating carrier and supported by the same. The circulating carrier presents a rectilinear operative branch, a rectilinear return branch parallel to the operative branch and two curved branches configured to connect the operative branch and the return branch with each other.

Furthermore, the circulating carrier comprises a plurality of coil elements and each of the first and second conveying elements comprises magnetic elements adapted to selectively cooperate with the coil elements so as to advance the first and second conveying elements independently of each other along a path defined by the circulating carrier itself.

Moreover, each first conveying element and one respective neighboring second conveying element are adapted to advance in cooperation one respective packaging unit along the rectilinear transport path defined by the operative branch.

An essentially similar transport device e.g. adapted to compensate for an irregular supply of packaging units is disclosed in WO2013189656. In this case, the packaging units are defined by pouches.

The transfer devices disclosed in WO2013185957 and WO2013189656 are construed to advance packaging units solely along rectilinear transport paths. The advancement of packaging units along curved branches is in fact subjected to geometrical limitations; the cooperation of one first and one second conveying element transporting therebetween one respective packaging unit along a transport path is difficult to be realized and depends on the angle of the curved branches with respect to the adjacent rectilinear branches.

A further transfer device as disclosed in EP2511203 is adapted to advance packaging units from a receiving position to a delivery position through a first and a second conveyor cooperating to one another.

The first and second conveyor comprise respectively a first horizontal circulating carrier and a horizontal second circulating carrier arranged side by side and each presenting a respective rectilinear operative branch, a respective return branch parallel to the respective operative branch and two respective curved branches for connecting the respective operative and return branches. Furthermore, the transfer device comprises a support unit, which is disposed between the operative branches of the first and second circulating carrier and on which the packaging units rest when advanced by the first and second conveyor.

More specifically, the first conveyor comprises a plurality of first conveying elements adapted to advance along a first path defined by the first circulating carrier, and the second conveyor comprises a plurality of second conveying elements configured to advance along a second path defined by the second circulating carrier. Each first conveying element and each second conveying element can be selectively controlled in speed and position. The operative branches of the first and second path are parallel to one another.

Furthermore, each first conveying element and one respective second conveying element are adapted to advance in cooperation a respective packaging unit, resting on the support unit, along a rectilinear transfer path, which is interposed between the operative branches of the first and second circulating carrier and is parallel to both.

Even in this case, the transfer device of EP2511203 is only configured to advance respective packaging units along a rectilinear transfer path.

Plus, the transfer device occupies significant space due to the location of the first and second conveyor on the opposite sides of the transfer path.

Furthermore, operation of the transfer device relies on the support unit coming along with additional parts, increased costs and additional control issues.

DISCLOSURE OF INVENTION

It is an object of the present invention to provide a transfer device designed to overcome, in a straightforward manner, at least one of the aforementioned drawbacks.

According to the present invention, there is provided a transfer device as claimed in claim 1.

BRIEF DESCRIPTION OF THE DRAWINGS

Three non-limiting embodiments of the present invention will be described by way of example with reference to the accompanying drawings, in which.

BEST MODE FOR CARRYING OUT THE INVENTION

Figure 1:
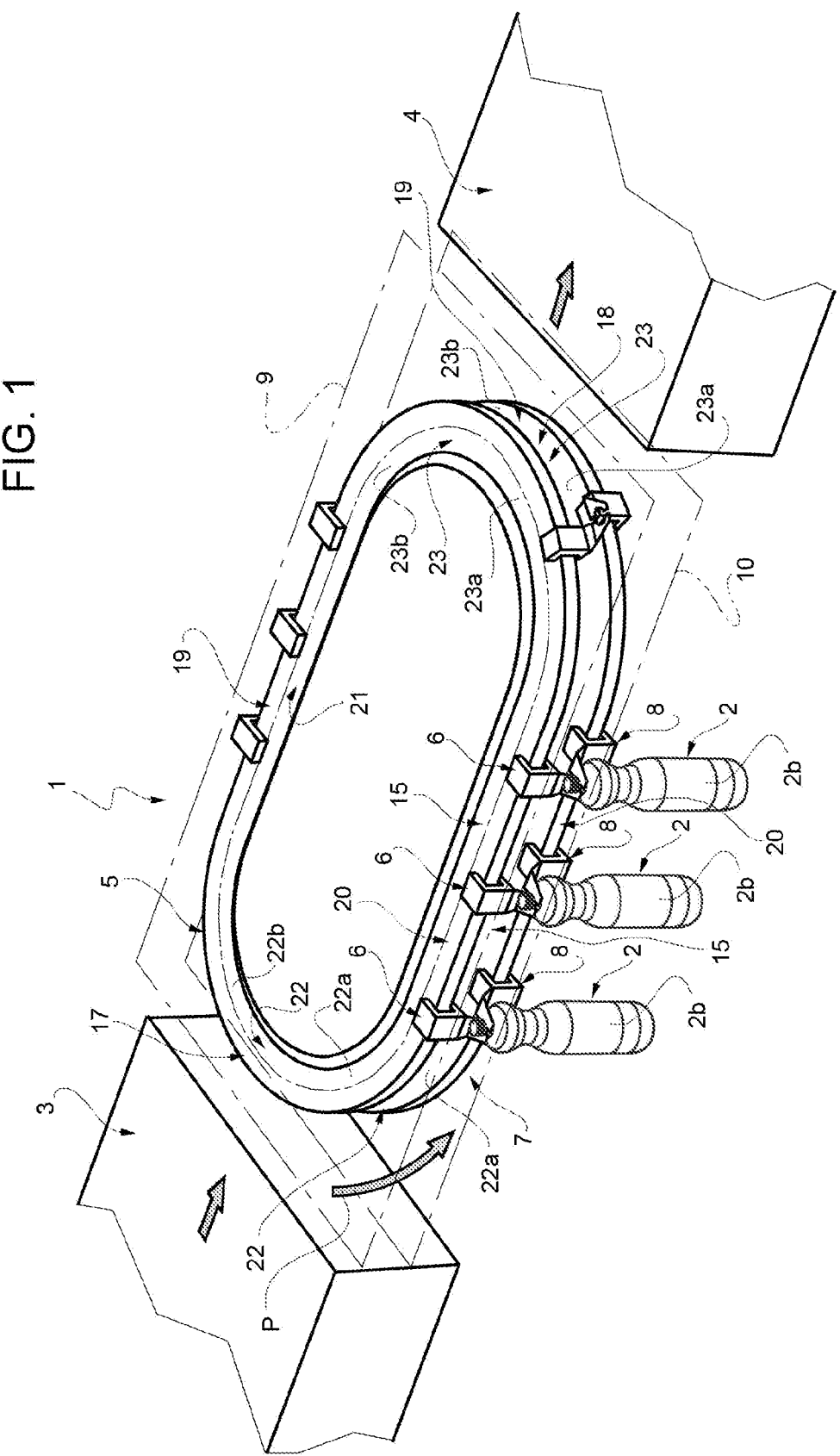
FIG. 1 shows a perspective view of a transfer device according to the present invention with details removed for clarity.

Number 1 in FIG. 1 indicates as a whole a transfer device adapted to convey a plurality of packaging units, in particular bottles 2 along a transfer path P from a first treatment device 3 to a second treatment device 4. In the following, the description of the example embodiments is based on conveying bottles 2, which, however, must be understood in a non-limiting manner as also other packaging units such as containers, receptacles, pre-forms and batches thereof may be conveyed by transfer device 1.

Transfer device 1 comprises:
- a first endless circulating carrier 5;
- a plurality of first conveying elements 6 advanced independently from each other along circulating carrier 5;
- a second endless circulating carrier 7 adjacent to circulating carrier 5; and
- a plurality of second conveying elements 8 advanced independently from each other along circulating carrier 7 and also independently controlled from conveying elements 6.

Each conveying element 6 of the plurality of conveying elements 6 and a corresponding conveying element 8 of the plurality of conveying elements 8 are configured to retain therebetween one respective bottle of the succession of bottles 2 and to advance the latter along transfer path P.

Figure 2:
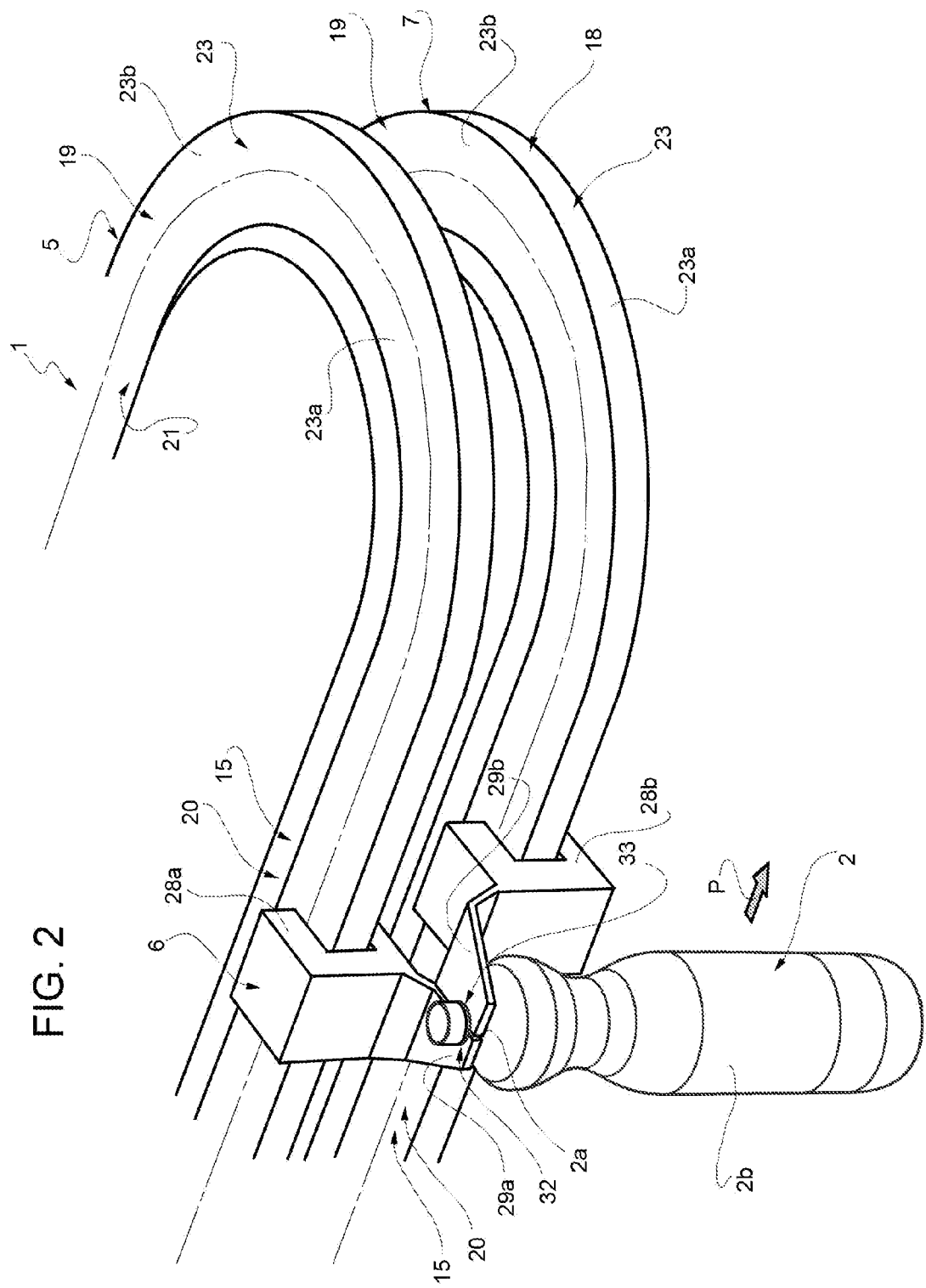
FIG. 2 shows a larger-scale perspective view of a detail of the transfer device of FIG. 1.

In the example shown in FIGS. 1 and 2, each conveying element 6 is conveniently placed upstream of the bottle 2 to be advanced along transfer path P, whilst each conveying element 8 is conveniently placed downstream of such bottle 2.

According to an important aspect of the present invention, circulating carrier 5 lays on a plane 9 and circulating carrier 7 lays on another plane 10 parallel and spaced apart from the plane 9.

In the examples of FIGS. 1 to 4, plane 9 and plane 10 are horizontally disposed and transfer path P also lays on a horizontal plane.

With reference to FIG. 1, circulating carriers 5 and 7 are aligned with respect to one another; in particular circulating carrier 5 is superimposed on circulating carrier 7.

Moreover, circulating carrier 5 comprises:
- an operative branch 15, along which each conveying element 6 is adapted to cooperate with one respective bottle 2 and which extends from a receiving position 17 in the proximity of treatment device 3 to a delivery position 18 in the proximity of treatment device 4; and
- one return branch 19 extending from delivery position 18 to receiving position 17 and along which conveying elements 6 go back to the beginning of operative branch 15.

In more detail, circulating carrier 5 presents:
a first rectilinear segment 20;
a second rectilinear segment 21 parallel to rectilinear segment 20; and
first and second curved segments 22, 23 adapted to connect rectilinear segments 20, 21 with one another.

Thus, operative branch 15 is in the example embodiment of FIG. 1, defined by a first portion 22a of curved segment 22, by rectilinear segment 20 and by a first portion 23a of curved segment 23. Accordingly, return branch 19 is determined by a second portion 23b of curved segment 23, by rectilinear segment 21 and by a second portion 22b of curved segment 22.

The two portions 22a and 22b of curved segment 22 are divided by the receiving position 17 of the bottles 2; in an analogous manner, the two portions 23a and 23b of curved segment 23 are divided by the delivery position 18 of the bottles 2.

Furthermore, rectilinear segments 20, 21 and curved segments 22, 23 of circulating carrier 5 are configured flat with respect to their respective lengths.

Additionally, circulating carrier 5 comprises a plurality of respective coil elements (not shown and known as such) adjacently arranged along respective rectilinear and curved segments 20, 21, 22, 23 and actuated selectively and independently to move the respective conveying elements 6.

Circulating carrier 7 and circulating carrier 5 are identical to one another and, thus, for the sake of simplicity and conciseness, in the following, the components of circulating carrier 7 are not described in detail and are indicated in FIGS. 1 and 2 with the same numeral references used for the corresponding components of circulating carrier 5.

As clearly visible in FIGS. 1 and 2, operative branch 15 of circulating carrier 7, along which each conveying element 8 is adapted to cooperate with one respective bottle 2, is aligned with operative branch 15 of circulating carrier 5 in a direction orthogonal to the planes 9, 10.

Operative branches 15 lay on respective planes 9, as the corresponding circulating carriers 5, 7 to which they belong.

Operative branches 15 of circulating carriers 5, 7 define the configuration of the transfer path P for the transportation of the bottles 2 from the receiving position 17 to the delivery position 18; in particular, the profile of transfer path P is parallel to the profiles of operative branches 15; in addition, the direction of alignment of operative branches 15 is also orthogonal to transfer path P.

As shown in FIGS. 1 and 2, each conveying element 6 is supported by circulating carrier 5 and integrally comprises an engagement portion 28a, coupled to circulating carrier 5 in a sliding manner, and a clamp portion 29a adapted to interact with one respective bottle 2 on one side thereof, in the example shown with a neck 2a of such bottle 2.

Equivalently, each conveying element 8 is supported by circulating carrier 7 and comprises an engagement portion 28b, coupled to circulating carrier 7 in a sliding manner, and a clamp portion 29b adapted to interact with one respective bottle 2 on an opposite side thereof with respect to the side with which the corresponding conveying element 6 cooperates; even in this case, clamp portion 29b interacts with a neck 2a of the respective bottle 2.

Each clamp portion 29a in cooperation with one respective clamp portion 29b is adapted to grip and retain one respective bottle 2 in such a way that this bottle 2 is advanced by both the respective conveying elements 6 and 8 along transfer path P.

In greater details, each engagement portion 28a, 28b comprises one or more magnetic elements (not shown and known as such) adapted to cooperate with the respective coil elements of the respective circulating carrier 5, 7.

Additionally, each engagement portion 28a, 28b presents a C-shaped profile engaged by and partially encompassing the respective circulating carrier 5, 7. In particular, each engagement portion 28a, 28b is coupled to respective circulating carrier 5, 7 by mechanical, mechanical-magnetic or only magnetic means (not shown and known as such) so as to establish a stable and defined advancement of the respective conveying element 6, 8 along the respective circulating carrier 5, 7.

Each clamp portion 29a, 29b projects from a region of the respective engagement portion 28a, 28b opposite the one coupled to the respective circulating carrier 5, 7. Additionally, each clamp portion 29a, 29b presents a rising or a descending profile with respect to planes 9 or 10. In particular, clamp portions 29a project from the respective engagement portions 28a towards plane 10 and have descending profiles; clamp portions 29b project from the respective engagement portions 28b towards plane 9 and have rising profiles.

Each clamp portion 29a comprises an indentation that is shaped for accommodating a portion of a neck of a bottle, and in the illustrated example it is a semicircular indentation 32 configured to partially receive and encircle one side of the neck 2a of one respective bottle 2. Other configurations such as V-shaped indentations may also be used.

In a completely equivalent manner, each clamp portion 29b comprises an indentation that is shaped for accommodating a portion of a neck of a bottle, in the specific example the indentation is a semicircular indentation 33 configured to partially receive and encircle an opposite side of the neck 2a of one respective bottle 2 with respect to the side of the same neck 2a received in the indentation 32 of the corresponding conveying element 6.

In the particular example of FIGS. 1 and 2, the indentation 32 of each conveying element 6 is configured to contact the neck 2a of the relative bottle 2 on an upstream side thereof with respect to the transfer path P, whilst the indentation 33 of each conveying element 8 is configured to contact the neck 2a of the relative bottle 2 on a downstream side thereof.

In this way, the indentations 32, 33 of each couple of conveying elements 6 and 8 cooperating with one bottle 2 define two halves of a substantially closed-loop seat encircling the neck 2a of such bottle 2.

Furthermore, transfer device 1 comprises a control unit (not shown and known as such) configured to control advancement of each conveying element 6, 8 along respectively circulating carrier 5 or 7. In particular, control unit is adapted to actuate the plurality of respective coil elements.

In use, transfer device 1 receives a succession of bottles 2 from treatment device 3 at receiving position 17 and advances them along transfer path P to delivery position 18, where such bottles 2 are fed to treatment device 4. In particular, each bottle 2 is conveyed by cooperation of one respective conveying element 6 of the plurality of conveying elements 6 and one respective conveying element 8 of the plurality of conveying elements 8, which advance along respective endless circulating carriers 5 and 7.

For reasons of conciseness and clarity, in the following, the operation of transfer device 1 will be described with reference to one bottle 2 only; however, it must be understood that the steps that will be described apply to all other bottles 2 to be transferred from treatment device 3 to treatment device 4.

In particular, when one bottle 2 is delivered from treatment device 3 to receiving position 17, it is gripped and retained between the clamp portion 29b of one conveying element 8 preceding the bottle 2 itself along transfer path P and the clamp portion 29a of the following conveying element 6. More specifically, the clamp portion 33 of the conveying element 8 contacts the bottle 2 on the downstream side thereof and the clamp portion 32 of the conveying element 6 engages the bottle 2 on the upstream side thereof.

Then, conveying elements 6 and 8 are advanced along respectively circulating carrier 5 and 7 towards delivery position 18 so that bottle 2 is conveyed along transfer path P towards treatment device 4. At delivery position 18 the conveying elements 6, 8 are controlled so that their respective clamp portions 29a, 29b loose contact with the bottle 2 and the latter is received in a known manner by treatment device 4.

After having released the bottle 2, the conveying elements 6 and 8 are advanced along respective return branches 19 of circulating carriers 5, 7 towards receiving position 17 for conveying another bottle 2 from the receiving position 17 itself to delivery position 18.

It must be understood that the speed of advancement of each bottle 2 can be controlled independently from the advancement speeds of other bottles 2 also permitting an interruption of advancement. Thus, transfer device 1 permits to compensate for eventual differing processing speeds of treatment devices 3 and 4.

Furthermore, transfer device 1 allows for the formation of groups of bottles 2 to be transported to transfer device 4 or for realizing and guaranteeing equidistant feed of the bottles 2 to treatment device 4.

Figure 3:
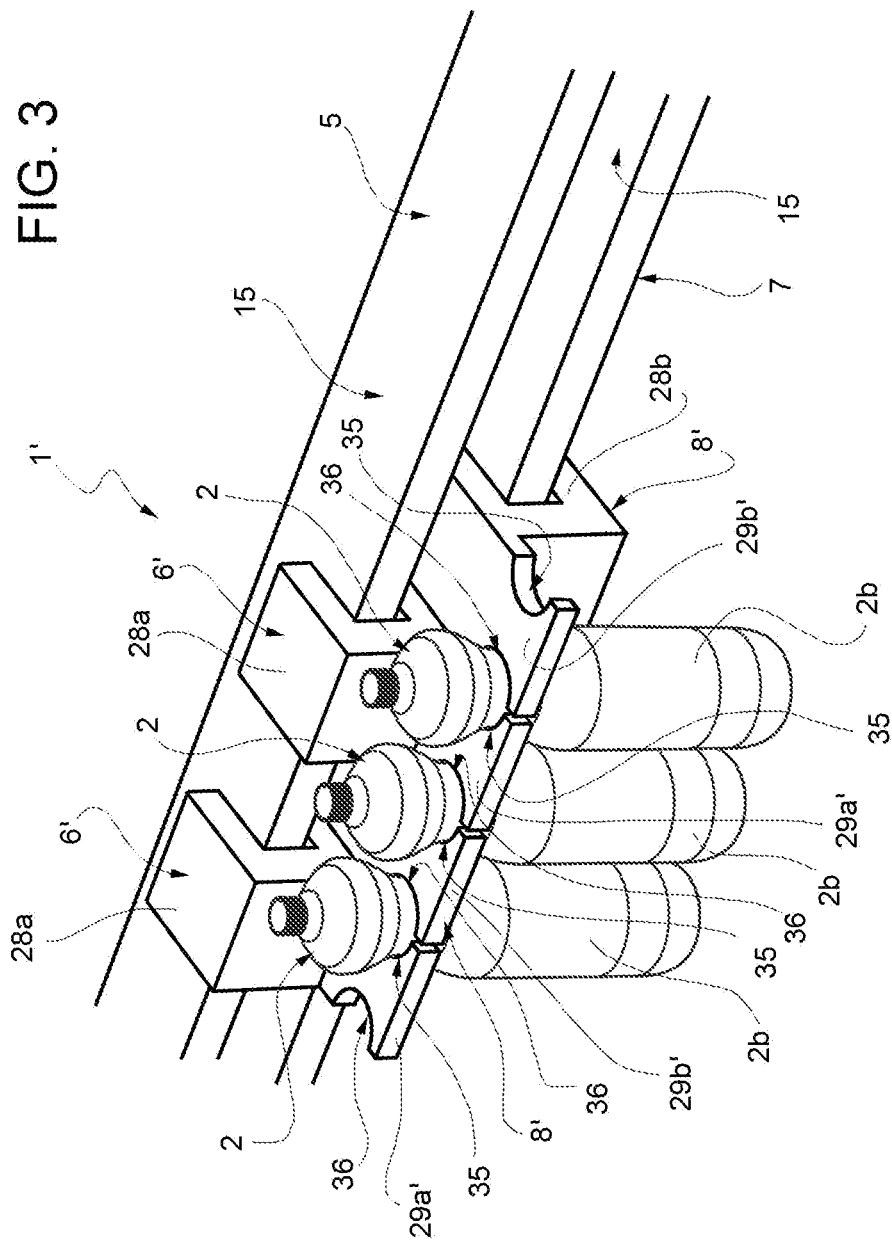
FIG. 3 shows a perspective view of a detail of an alternative embodiment of a transfer device according to the present invention.

Number 1' in FIG. 3 indicates as a whole a different embodiment of a transfer device according to the present invention; transfer device 1 and 1' being similar to one another, the following description is limited to the difference between them, and using the same references, where possible, for identical or corresponding parts.

In particular, transfer device 1' differs from transfer device 1 basically by comprising conveying elements 6' and 8', similar to respective conveying elements 6, 8 and each configured to simultaneously interact with two consecutive bottles 2, one preceding the conveying element 6', 8' itself and the other one following the latter.

In greater details, each conveying element 6', 8' comprises a clamp portion 29a', 29b' having, at its opposite downstream and upstream ends with reference to transfer path P, respective semicircular indentations 35, 36 with opposite cavities and adapted to receive two consecutive bottles 2 advanced along the transfer path P itself.

Clamp portions 29a' and 29b' are identical to one another and are defined by plate-elements extending along a common plane parallel to and intermediate between planes 9 and 10.

In this case, indentations 35, 36 of each clamp portion 29a', 29b' are configured to engage the respective bottles 2 at body portions 2b thereof.

More specifically, the two facing indentations 35, of two consecutive conveying elements 6', 8' advancing along transfer path P and cooperating with one bottle 2 define two halves of a substantially closed-loop seat encircling the body portion 2b of such bottle 2.

The operation of transfer device 1' is completely similar to that of transfer device 1, the only difference being the fact that each conveying element 6', 8' may be used to cooperate with two consecutive bottles 2; in this way, a given number of bottles 2 may be fed as a group to treatment device 4 (see for instance the three bottles 2 shown in FIG. 3).

Figure 4:
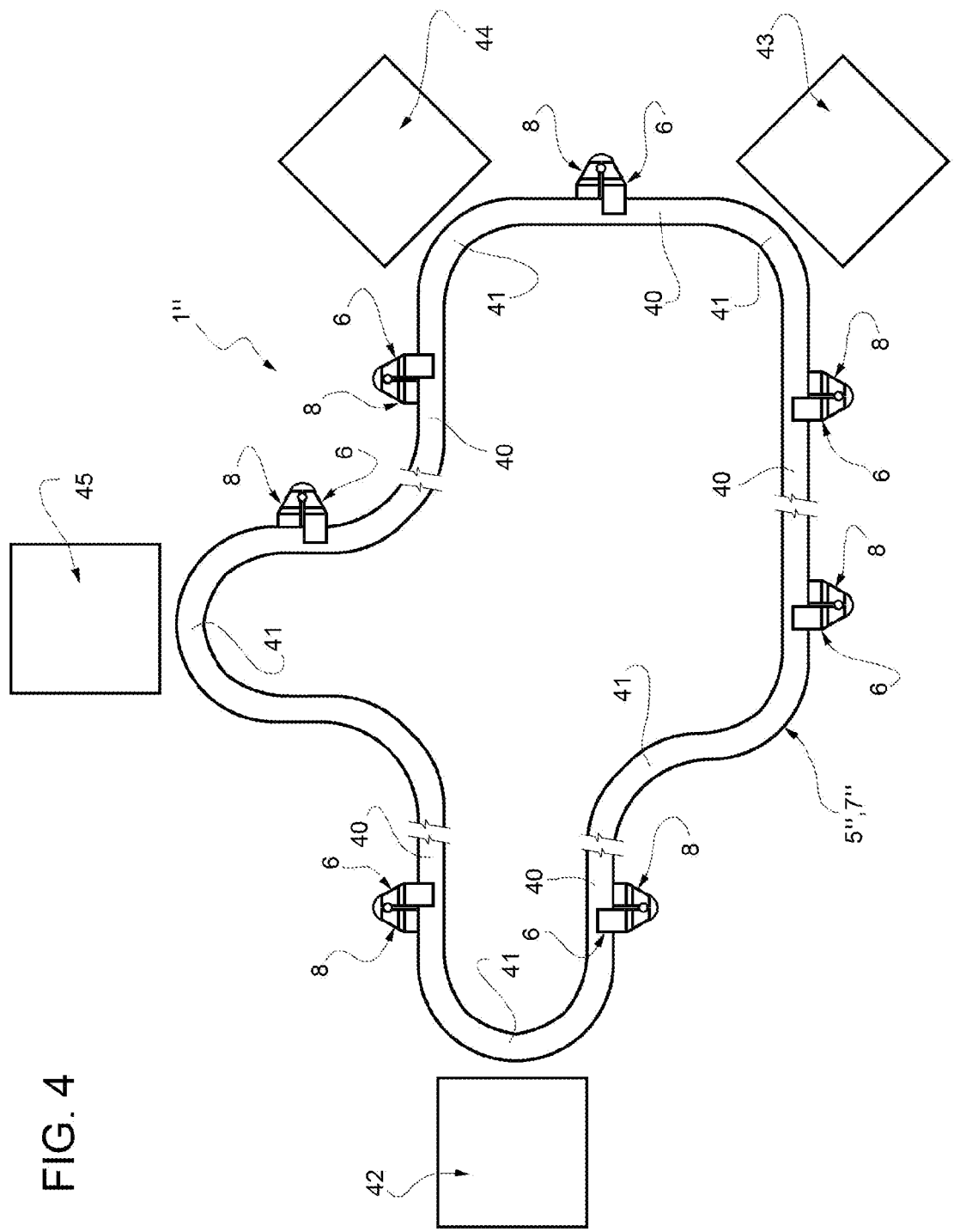
FIG. 4 shows a top-plan view of a further alternative embodiment of a transfer device according to the present invention.

Number 1" in FIG. 4 indicates as a whole a different embodiment of a transfer device according to the present invention; transfer device 1″ and 1 being similar to one another, the following description is limited to the difference between them, and using the same references, where possible, for identical or corresponding parts.

In particular, transfer device 1″ differs from transfer device 1 by comprising two endless circulating carriers 5″, 7″, each of which includes a plurality of rectilinear segments 40, in particular more than two, and a plurality of curved segments 41, in particular more than two, which overall define a complex configuration of respective circulating carriers 5″ and 7″.

In the specific example, four treatment devices 42, 43, 44, 45 are arranged around circulating carriers 5″, 7″.

In this case, the circulating carriers 5″, 7″ are, at any portion, of the same types as circulating carriers 5, 7 and cooperate with respective conveying elements 6, 8 identical to those used in transfer device 1. As a possible alternative solution, circulating carriers 5″, 7″ may also cooperate with respective conveying elements 6′, 8′.

The advantages of transfer devices 1, 1′, 1″ according to the present invention will be clear from the foregoing description.

In particular, the specific alignment of circulating carriers 5 and 7 (or 5″ and 7″) with respect to one another on respective parallel and spaced apart parallel planes 9 and 10 allows a compact design of transfer devices 1, 1′, 1″.

Furthermore, conveying elements 6, 6′, 8, 8′ are configured in such a way that bottles 2 can be advanced without any further support.

Additionally, the plurality of conveying elements 6, 6′ is associated to circulating carrier 5, 5″ and the plurality of conveying elements 8, 8′ is associated to circulating carrier 5, 5″; conveying elements 6, 6′ and conveying elements 8, 8′ are controlled independently from each other. Thus, in use, each conveying element 6, 6′ and the respective conveying element 8, 8′ can be advanced in such a way to optimize positioning with respect to each other so that varying bottle sizes can be handled by transfer devices 1, 1′, 1″ without the need of modifications of transfer devices 1, 1′, 1″ themselves.

Finally, the independent control of conveying elements 6, 6′ and conveying elements 8, 8′ also allows for positioning of each conveying element 6, 6′ and the respective conveying element 8, 8′ so that advancement of one respective bottle 2 parallel to curved segments 22, 23, 41 of circulating carriers 5, 5″, 7, 7″ can be obtained and bottles 2 can be advanced not only along rectilinear segments 20, 40, but also along curved segments 22, 23, 41 presenting any kind of curvature.

Clearly, changes may be made to transfer devices 1, 1′, 1″ as described and illustrated herein without, however, departing from the scope of protection as defined in the accompanying claims.

In particular, circulating carriers 5, 7, 5″, 7″ may also present circular endless configurations.

In addition, circulating carriers 5, 7 and 5″, 7″ may also lay on respective planes having different orientations from the horizontal one described in the example embodiments shown in FIGS. 1 to 4.

The invention claimed is:

1. A transfer device for conveying a plurality of packaging units along a transfer path from a first treatment device to a second treatment device, the transfer device comprising:
    a first circulating carrier having at least one first operative branch parallel to the transfer path, the first circulating carrier including a plurality of coil elements;
    at least one first conveying element configured to be advanced along the first circulating carrier, the first conveying element including at least one magnetic element adapted to magnetically interact with the coil elements of the first circulating carrier;
    a second circulating carrier adjacent to the first circulating carrier and having at least one second operative branch parallel to the transfer path and to the first operative branch, the second circulating carrier including a plurality of second coil elements; and
    at least one second conveying element configured to be controlled independently from the first conveying element and advanced along the second circulating carrier, the second conveying element including at least one second magnetic element adapted to magnetically interact with the second coil elements,
    wherein:
        the first conveying element includes a first clamp portion and the second conveying element includes a second clamp portion, the first clamp portion and the second clamp portion configured to grip and retain therebetween a packaging unit of the plurality of packaging units and to advance the packaging unit along the transfer path from the first treatment device to the second treatment device;
        the first operative branch lies on a first plane;
        the second operative branch lies on a second plane that is parallel and spaced apart from the first plane;
        the first and second operative branches are aligned in a direction orthogonal to the first and second planes and to the transfer path; and
        the first circulating carrier is superimposed on the second circulating carrier.

2. The transfer device according to claim 1, wherein the first circulating carrier and the second circulating carrier are identical.

3. The transfer device according to claim 1, wherein each of the first circulating carrier and second circulating carrier is circular or elliptic.

4. The transfer device according to claim 1, wherein each of the first operative branch and the second operative branch includes at least one curved segment and at least one rectilinear segment.

5. The transfer device according to claim 1, wherein
    the first clamp portion includes at least one first indentation configured to at least partially receive and encircle the packaging unit,
    the second clamp portion includes at least one second indentation configured to at least partially receive and encircle the packaging unit, and
    the first indentation of the first conveying element defines a first half of a substantially closed-loop seat encircling the packaging unit, and the second indentation of the second conveying element defines a second half of the seat encircling the packaging unit.

6. The transfer device according to claim 1, wherein each of the first clamp portion and the second clamp portion includes, at opposing downstream and upstream ends with reference to the transfer path, one first indentation and one second indentation with opposite cavities and adapted to receive two consecutive packaging units advanced along the transfer path.

7. The transfer device according to claim 6, wherein the first clamp portion and the second clamp portion have identical configurations.

8. The transfer device according to claim 1, wherein the first circulating carrier cooperates with a plurality of first conveying elements advanced independently from each other along the first circulating carrier, and wherein the second circulating carrier cooperates with a plurality of second conveying elements advanced independently from each other along the second circulating carrier.

9. The transfer device according to claim 6, wherein one of the first indentation and the second indentation of the first clamp portion defines a first half of a substantially closed-loop seat encircling the packaging unit, and one of the first indentation and the second indentation of the second clamp portion defines a second half of the seat encircling the packaging unit.

\* \* \* \* \*